US008402125B2

(12) United States Patent
Soulet et al.

(10) Patent No.: US 8,402,125 B2
(45) Date of Patent: Mar. 19, 2013

(54) METHOD OF MANAGING OPERATIONS FOR ADMINISTRATION, MAINTENANCE AND OPERATIONAL UPKEEP, MANAGEMENT ENTITY AND CORRESPONDING COMPUTER PROGRAM PRODUCT

(75) Inventors: Serge Soulet, Rennes (FR); Patrick Gangneux, Saint-Sulpice la Forêt (FR)

(73) Assignee: Refresh IT Solutions, Rennes (FR)

( * ) Notice: Subject to any disclaimer, the term of this patent is extended or adjusted under 35 U.S.C. 154(b) by 363 days.

(21) Appl. No.: 12/739,910

(22) PCT Filed: Oct. 21, 2008

(86) PCT No.: PCT/EP2008/064204
§ 371 (c)(1),
(2), (4) Date: Jul. 8, 2010

(87) PCT Pub. No.: WO2009/053356
PCT Pub. Date: Apr. 30, 2009

(65) Prior Publication Data
US 2010/0281294 A1    Nov. 4, 2010

(30) Foreign Application Priority Data
Oct. 26, 2007    (FR) ...................................... 07 58624

(51) Int. Cl.
*G06F 15/173*    (2006.01)
(52) U.S. Cl. ...................................... 709/223; 709/224
(58) Field of Classification Search .................. 709/223, 709/224
See application file for complete search history.

(56) References Cited

U.S. PATENT DOCUMENTS

| | | | |
|---|---|---|---|
| 6,256,635 B1 * | 7/2001 | Arrouye et al. ........................ 1/1 |
| 2001/0056486 A1 * | 12/2001 | Kosaka .......................... 709/224 |
| 2002/0169824 A1 * | 11/2002 | Dettinger ....................... 709/203 |
| 2004/0031059 A1 * | 2/2004 | Bialk et al. ..................... 725/129 |
| 2004/0044993 A1 * | 3/2004 | Muller et al. .................. 717/124 |
| 2004/0111502 A1 * | 6/2004 | Oates ............................. 709/223 |
| 2007/0027506 A1 | 2/2007 | Stender et al. |
| 2007/0094658 A1 | 4/2007 | DiCarlo et al. |

FOREIGN PATENT DOCUMENTS

| | | |
|---|---|---|
| EP | 1530129 B1 | 5/2005 |
| JP | 2000298578 A | 10/2000 |
| WO | 0206967 A1 | 1/2002 |

OTHER PUBLICATIONS

International Search Report dated Apr. 2, 2009 for corresponding International Application No. PCT/EP2008/064204, filed Oct. 21, 2008.
International Preliminary Report on Patentability and Written Opinion dated Jun. 10, 2010 for corresponding International Application No. PCT/EP2008/064204 filed Oct. 21, 2008.

* cited by examiner

*Primary Examiner* — Brian P Whipple
(74) *Attorney, Agent, or Firm* — David D. Brush; Westman, Champlin & Kelly, P.A.

(57) ABSTRACT

A method and apparatus are provided for managing administrative and maintenance operations for a computer connected to a communication network. The method includes: a phase of receiving a request in respect of at least one command to be executed, originating from the computer; a phase of programmed sequential distribution of the at least one command previously recorded within an operations database, destined for the computer; a phase of recording, within a database for collecting results associated with the computer, at least one result of implementing the at least one sequentially distributed command.

9 Claims, 4 Drawing Sheets

METHOD OF MANAGING OPERATIONS FOR ADMINISTRATION, MAINTENANCE AND OPERATIONAL UPKEEP, MANAGEMENT ENTITY AND CORRESPONDING COMPUTER PROGRAM PRODUCT

CROSS-REFERENCE TO RELATED APPLICATIONS

This Application is a Section 371 National Stage Application of International Application No. PCT/EP2008/064204, filed Oct. 21, 2008 and published as WO 2009/053356 on Apr. 30, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a method enabling management and maintenance operations to be carried out on a plurality of computers, as well as a device for the implementation of same.

One field of application of the disclosure relates to facilities management, comprising international facilities management, of computer populations installed in large entities such as large-scale businesses. Such facilities management comprises operations for the administration, maintenance and operational upkeep of the population's computers.

Facilities management of a computer population consists in remote management of the computers comprising the computer population. The management operation is most often carried out by way of so-called help desk platforms or administration platforms. Such platforms enable administrators to interact remotely with certain machines of the computer population.

These remote administration solutions are often used for monitoring servers, e.g., which require a high level of availability. Systems likewise exist which enable remote administration and control of computers.

BACKGROUND OF THE DISCLOSURE

Traditionally, the possibility exists for monitoring computer equipment by means of dedicated tools enabling an operator to be informed, at a given moment, about the status of a piece of equipment or set of equipment, via a supervisory console.

These supervisory tools are not deployed nowadays for monitoring a group of workstations, but rather for servers or network equipment, often fewer in number within the business.

Such administration systems are suitable for monitoring events occurring in real time in large-scale computer systems. In particular, they use an event-capturing principle based on the SNMP protocol (Simple Network Management Protocol). This communication protocol enables the administrators of computer populations to manage network equipment, monitor and diagnose network problems and hardware remotely. Numerous administration and monitoring mechanisms exist which use this protocol.

Other remote administration possibilities are likewise offered by specific applications, such as the so-called "VNC" (Virtual Network Computing) applications, which enable one to connect to remote computers and to "take control" of same in order to perform maintenance tasks. However, such applications require the active involvement of a computer system administrator in order to carry out the operations in question.

DISADVANTAGES OF THE PRIOR ART

One disadvantage of this technique of the prior art is that the implementation of administration solutions as described above, which are likewise called "Help Desk" solutions, is consuming of resources, both at the human level, via the mobilisation of numerous skills, as well as at the computer level, via significant use of bandwidth and communication network-related resources.

Another disadvantage of this technique of the prior art is the use of the SNMP protocol. As a matter of fact, this protocol is based on the use of an MIB (Management Information Base) implemented within each system being monitored. This MIB database is used to store hardware information, configuration parameters and performance statistics.

In addition, each system being monitored implements an SNMP agent, which is permanently responsible for monitoring the events which occur and which enables a central system to recover the information contained in the MIB. The agents thus transmit the events to the central system while complying with SNMP protocol. Such being the case, this protocol, especially in versions 1 and 2 thereof, comprises numerous security flaws which render the information transmitted vulnerable.

Another disadvantage of the use of this SNMP protocol results from the fact that the agents must simultaneously manage the receiving of commands coming from the administration while recovering the events which occur at the workstation or server. Thus, an SNMP agent operates continuously and is responsible for independently performing a large number of tasks pre-programmed by the administrator. Thus, administration agents such as the SNMP agents implement "schedulers" which enable management of the tasks being carried out. Such being the case, such agents are complicated to program and require resources within the machines housing them.

SUMMARY

The solution proposed by an exemplary embodiment of the invention does not have these disadvantages of the prior art. As a matter of fact, an exemplary embodiment relates to a method of managing administration and maintenance operations for a computer connected to a communication network.

According to an embodiment of the invention, such a method comprises:
- a phase of receiving a request of at least one command to be executed, originating from said computer;
- a phase of programmed sequential distribution of said at least one command previously recorded within an operations database, intended for said computer;
- a phase of recording, within a database for collecting results associated with said computer, at least one result of implementing said at least one sequentially distributed command.

In this way, an embodiment of the invention mitigates the disadvantages of the prior art techniques by proposing a solution which does not require the establishment of a task-management and scheduling agent for the computer within which it is desired to carry out the operations in question. As a matter of fact, the computer sends a query request for at least one command to be executed to an entity which implements the method of an embodiment of the invention. A sequential (and) programmed phase for distribution of commands to a computer is then implemented so as to provide the computer with administration or maintenance commands. The computer executes these commands and forwards the results of these executions so that same are recorded within a results collection database.

An embodiment of the invention therefore mitigates the programming-related disadvantages of the prior art with respect to the administration and maintenance operations within computers, because the operations are not programmed within the computer itself but are centralised. The results of executing the commands comprising the operations are likewise centralised whereby it becomes easy to process these results. Thus, according to an embodiment of the invention, an agent which is implemented within the computer does not carry out any action permanently (task monitoring or programming). They are satisfied with asking the entity implementing the method of an embodiment of the invention what they should do.

According to an embodiment of the invention, the distribution is programmed, which means that it is the entity implementing the distribution which controls the command distribution and not the computer making the request for same. This thus differs from the mechanisms of the prior art, such as SNMP, wherein the supervisory entities issue requests to computers for purposes of obtaining data and not for purposes of transmitting commands.

According to one particular embodiment of the invention, said method comprises:
 a phase of automatically constructing a set of commands to be executed during a next maintenance operation on the basis of said at least one implementation result;
 a phase of recording, within said operations database, said set of commands to be executed.

In this way, an embodiment of the invention enables automatic management of the maintenance operations to be carried out based on the results of the previously executed commands for programming future operations.

As a matter of fact, according to an embodiment of the invention, and for a given computer, an administrator defines a first series of commands to be executed. The computer enquires about this series of commands via a command query request. These commands are next distributed to same and the computer returns the result of the executions thereof. Reference is made to a series of commands, however it is well understood that such a series may comprise a single command.

An embodiment of the invention thus enables operational upkeep of the computer. Operational upkeep can be defined as the set of means and procedures required for a piece of hardware (such as the computer) to remain capable of the use assigned thereto over the duration of use thereof. As a matter of fact, the execution of a command, such as a command to inspect a hard disk surface, produces a result which can be analysed (e.g., discovery of defective sectors). A command for correction of the anomaly can then be programmed (recovery of the defective sectors) in order to prevent a machine shutdown. This implementation of the method in order to anticipate the anomalies that might occur in the following days ensures that the computer is always under optimal operating conditions. The techniques of the prior art do not enable this operational upkeep to be automated. As a matter of fact, in the techniques of the prior art, it is necessary for the administrator to manually execute (and preferably in the presence of the station being administered) commands for correcting the problems which occur. The techniques of the prior art do not allow problems to be mitigated prior to the appearance thereof.

The method according to an embodiment of the invention next enables construction of a second series of commands which take account of the results of executing the first series of commands.

According to one particular feature of an embodiment of the invention, said method comprises, within said computer:
 a phase of executing said at least one command previously distributed during the distribution phase;
 a phase of transmitting said at least one implementation result of said at least one command.

According to an original embodiment of the invention, said programmed distribution phase of at least one pre-recorded command comprises:
 a step of searching, within said operations database, for a command to be transmitted to said computer based on command distribution programming providing command presence information; and
 a step of transmitting, to said computer, said command to be transmitted when said presence information is positive;
 a step of transmitting a hold command for said computer, when said presence information is negative.

An embodiment of the invention thus enables account to be taken of the absence of commands to be transmitted to the computer. As a matter of fact, an embodiment of the invention makes it possible to ensure that the computer does not continuously query in order to obtain a list of commands to be executed. Such an effect is obtained by transmitting a hold command for the computer, which enables same to not call upon the management entity for a specific time period. An embodiment of the invention thus enables the communication network resources to be saved, e.g., unlike the SNMP-based techniques of the prior art, which require intensive use of the communication network.

According to a particular embodiment of the invention, said execution phase comprises:
 a step of executing said at least one command;
 a step of formatting said at least one result of implementing said at least one command;
 a step of transmitting said at least one implementation result.

An embodiment of the invention thus enables the computer to transmit the formatted command execution results to the entity implementing the method. That means that a software agent installed on the computer is capable of constructing, in a specific format, the command execution results that it has launched, so as to provide the entity with the results which can be directly used by same.

According to one particular feature of an embodiment of the invention, said execution phase further comprises a first step of displaying a presentation interface comprising said at least one implementation result of said at least one command.

In this way, an embodiment of the invention enables presentation of the result of executing the command so that same is known, either by the administrator, when this display is intended thereto, or by the user of the computer, so that the user might have a proactive approach to the maintenance of their computer.

According one particular characteristic of an embodiment of the invention, said execution phase further comprises a second step of displaying a presentation interface comprising a warning intended for a user of said computer.

In this way, an embodiment of the invention enables information to be presented about the current or potential problems that the computer may encounter. These indications may be either for the administrator, when this display is intended thereto, or for the user of the computer, so that this user can have a proactive approach with regard to the maintenance of their computer.

According to one particular embodiment of the invention, when said at least one command results in failure, said recording phase comprises:
- a step of issuing an electronic message to party involved in processing an incident;
- a step of automatically programming execution of a corrective command, when said corrective command exists;
- a step of automatically programming a new execution of said at least command when said corrective command has been executed;
- a step of creating an incident ticket in an incident management system.

In this way, an embodiment of the invention enables a simple and efficient centralisation of the corrective actions and a new execution of the commands which have failed, thereby enabling the easing the work of the administrators while at the same time enabling increased efficiency of the corrective treatments that can be carried out automatically and immediately after receipt of the incident, without any outside intervention.

An embodiment of the invention likewise relates to a maintenance and administration operations management entity for a computer connected to at communication network.

According to an embodiment of the invention, such an entity comprises:
- means of receiving a query request from at least for at least one command to be executed, originating from said computer;
- means of programmed sequential distribution of at least one command previously recorded within an operations database, intended for said computer;
- means of recording, within a database for collecting results associated with said computer, at least one result of implementing said at least one sequentially distributed command.

In at least one embodiment of the invention, such an entity comprises means of implementing the management method as described above.

According to another aspect, an embodiment of the invention likewise relates to a computer program product downloadable from a communication network and/or stored on a computer-readable medium and/or executable by a microprocessor, and comprising program code instructions for executing the transmission method as described above.

BRIEF DESCRIPTION OF THE DRAWINGS

Other features and advantages will become more apparent upon reading the following description of a preferred embodiment, given for purely illustrative and non-limiting purposes, and from the appended drawings, in which.

DETAILED DESCRIPTION OF ILLUSTRATIVE EMBODIMENTS

1. Recall of the Principle of an Embodiment of the Invention

An embodiment of the invention offers the advantage of centralising the execution of administration and maintenance tasks for computers and computer servers at the computer population level. This centralisation is carried out by a specific entity of the communication network, which distributes the maintenance operations based on predetermined administration and maintenance strategies.

The use of an entity which implements a method according to an embodiment of the invention can be carried out in businesses which desire to provide their users with an impeccable quality of service or which desire to maintain a workstation population in a permanent state of use while at the same time thereby preventing losses in user productivity and while taking advance measures to prevent the occurrence of incidents.

It likewise enables the businesses to verify the use of the workstations, e.g., by verifying the presence of software or types of data prohibited in the business. Any technical task capable of being executed on a computer can thus be controlled from a system implementing the method of an embodiment of the invention.

The solution brought by an embodiment of the invention is useable in businesses without limitation on the number of computers. It may likewise be useable by facilities managers who operate several groups of workstations or servers.

The general principle of an embodiment of the invention is based on centralising the distribution of administration, maintenance and operational upkeep tasks to a plurality of computers which comprise a computer population. In this way, an embodiment of the invention makes it possible to avoid the disadvantages of the prior art techniques, in particular the disadvantages related to the programming of agents (particularly in the case of the use of the SNMP protocol) and to the implementation of databases, such as the MIB bases. As a matter of fact, an embodiment of the invention does not require the establishment of an agent having a high degree of "intelligence". The agent that can be implemented when the method according to an embodiment of the invention is used is simpler and less resource-intensive, insofar as:
- it does not require the local implementation of databases for the administered computer in order to preserve events;
- it does not perform any task permanently (such as monitoring tasks);
- it does not require implementation of a scheduler.

The implementation of such an agent is made possible according to an embodiment of the invention insofar as the maintenance and administration operations are managed centrally and automatically. As a matter of fact, according to an embodiment of the invention, the maintenance operations are ordered sequences of scripts which unfold over a predefined time period (e.g., one month, one week).

Figure 3:
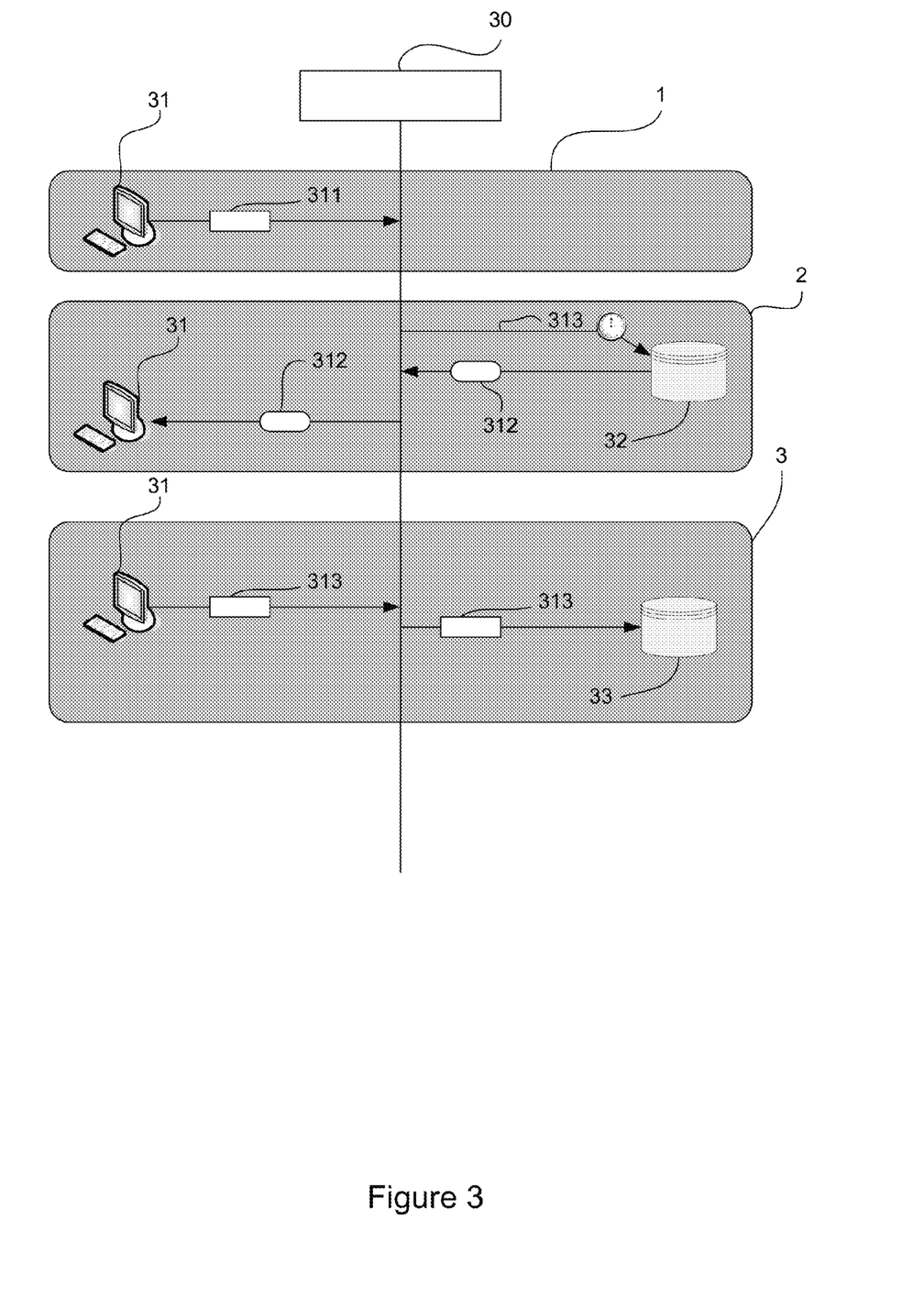
FIG. 3 describes the principal phases of the method of an embodiment of the invention.

The method according to an embodiment of the invention comprises the following phases, which are described in relation to FIG. 3:
- a phase of receiving 1 a query request 311 for at least one command to be executed, originating from the computer 31, e.g., by means of a software agent which is installed thereon. The agent requires commands from an entity 30 which implements the method. This is therefore not the case of a conventional process where it is an administrator who makes decisions about sending commands to a workstation.

a programmed sequential distribution phase 2 of said at least one command 312 previously recorded within an operations database 32, intended for said computer 31. Upon receipt of the query request 311, the entity 30 implementing the method of an embodiment of the invention verifies 313 the existence of a pre-recorded command which must be processed by the computer 31. If programming for such a command is present in the database, the entity distributes (delivers) this command to the computer in sequence (i.e., one after the other). If no command is programmed (i.e., there is no match between the moment when the computer makes the request and the moment when a command is provided), it is possible to transmit a command by default.

a phase of recording 3, within a database 33 for collecting results associated with the computer 31, at least one result 313 of implementing the sequentially distributed command. The computer within which the command is implemented forwards the result 313 of this command to the management entity 30, which saves it for subsequent uses, and in particular for the analysis and construction of a subsequent maintenance operation.

The expression "programmed sequential distribution" is understood to mean the fact that, if a query request for a command to be executed arrives at a moment T, but if this moment T is not the one at which it is anticipated that the command will be distributed to the computer which made the request for same, then this command is not sent to the computer. Thus, unlike the techniques of the prior art, an embodiment of the invention makes it possible to automatically preserve control of the administration, maintenance and operational upkeep operations within an entity which implements the method of an embodiment of the invention. As a matter of fact, according to the techniques of the prior art, distributions of commands are carried out by administrators via man-machine interfaces which enable commands to be executed to be sent to a computer (by using the SNMP protocol). However, when this involves executing commands at specific times, it is the target computer's operating system which must manage this execution programming, and not the system used by the administrator. The result of these techniques is that, if the computer which executes the command experiences a breakdown or is turned off, the command will not be executed. An embodiment of the invention enables this disadvantage to be mitigated by centralising the management of the maintenance task programming, thereby ensuring that, if a command must be executed (because the time or date of execution has been reached or exceeded), it will be executed immediately when a request is sent by the administered computer.

According to an embodiment of the invention, the maintenance and administration operations enable different maintenance configurations to be defined (i.e., scripts), which differ relative to computer profiles. In this way, it is simpler to manage a computer population by profile than by machine. These profiles can correspond to any machine which houses one type or another processor or one type or another memory space. The maintenance operations likewise enable certain types of particular maintenance operations to be programmed. For example, one maintenance operation can be dedicated to checking the hardware components of a computer while another can deal with corrections in a file system.

According to an embodiment of the invention, a maintenance script is a succession of commands only the first one of which is time-stamped, the following ones being executed at the end of the preceding one.

In this way, a script enables a succession of commands to be executed, which have a connectivity link between one another. Therefore, according to an embodiment of the invention, it is possible to program the execution of a task (and therefore of a script) at a predefined time, and to not program the following tasks. In this way, if a task is lengthy to execute, the other tasks will not be launched as long as the preceding task has not completed. A logical continuity of the basic tasks and the validity of the script executed are thereby ensured. According to an embodiment of the invention, "programming the execution of a script" does not consist in programming an agent to execute a certain number of tasks at a specific time, but rather in carrying out such programming at the level of the maintenance and administration management entity.

A command can be considered to be an elementary job to be carried out on a computer.

The An embodiment of the invention implements a concept of unspecified temporal programming of tasks. As a matter of fact, a maintenance operation, for example, can consist in checking the hardware and software of a computer. According to an embodiment of the invention, such an operation should be executed over one month, for example (the sequential distribution of the commands thus enables the operation to be spread out over a predetermined time period). In our example, it comprises two scripts: a hardware check script and a software check script. The method of an embodiment of the invention is implemented for this operation which must be executed over a one-month period. Such being the case, since a script is a succession of commands only the first one of which is time-stamped, it is not possible to know the end time of a script. Consequently, based on the observed end time of a script, the management entity which implements an embodiment of the invention can program the execution of the second script for the operation only when it is aware of the end of the first one. According to an embodiment of the invention, an implementation such as this makes it possible to not overload the computers with maintenance commands and to take account of the results produced by the first script, in order to adapt the second script as needed. In this way, for example, if, in a first script, a command to inspect the surface of a hard disk has made it possible to detect defective sectors at the surface of this disk, the management entity can astutely take account of this result, in a second script to be executed immediately (i.e., upon receipt of a new request from the computer), in order to program the execution of a command to repair these defective sectors. Such a programming operation is automated using the method of an embodiment of the invention.

In particular, the situation is presented hereinbelow of an implementation of an embodiment of the invention by using a centralised management entity which communicates with workstations under a Windows (Trademark) environment via the HTTPS protocol. However, it is clear that the invention is not limited to this particular implementation, but can likewise be implemented in numerous other ways.

2. Description of an Embodiment

Figure 1:
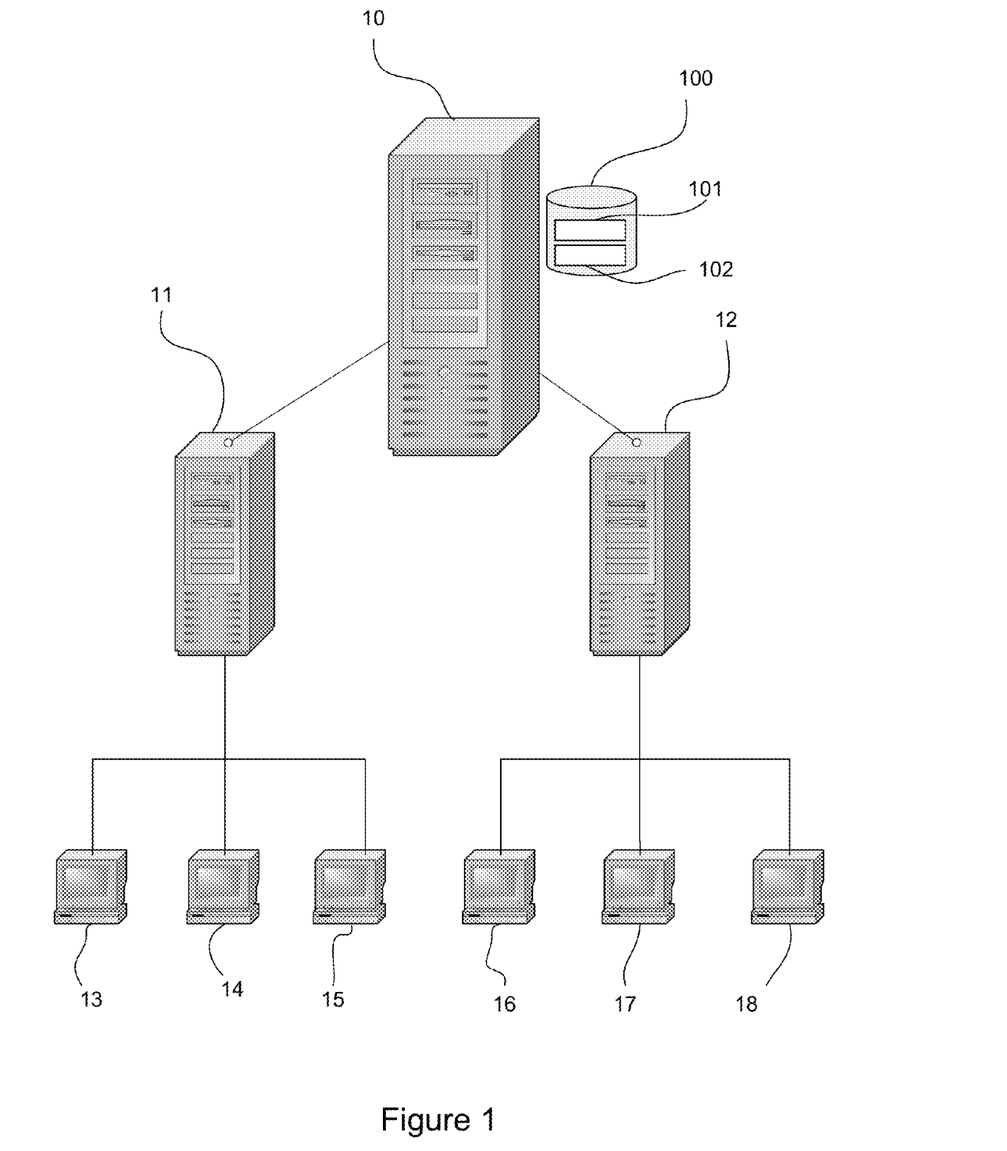
FIG. 1 shows a system architecture enabling implementation of the method of an embodiment of the invention.

In this embodiment, the implementation of the method of the invention by means of an application server is presented. The architecture used is presented in relation to FIG. 1. A database server 10 is connected to a plurality of Web servers 11, 12. The database server 10 contains a database 100 consolidating the operations data 101 and the command implementation results data 102 (which are archived). These two sources of data can likewise be implemented within two separate databases. The Web servers 11, 12 are connected to the computers 13 to 18 by means of the HTTP and/or HTTPS protocols. Agents 13*a* to 18*a* responsible for implementing the commands that they receive from the Web servers 11, 12 are installed on the computers 13 to 18.

In this embodiment, the principle adopted for offering the described service is based upon an ad hoc set of tasks which is responsible for communicating with the computer being supervised in order to ask same to perform a certain technical task.

Each workstation has a software agent, which periodically queries the central server or servers by means of the Web servers. This or these central server(s) then supply the computer with the command to be executed, if applicable, by way of the previously established HTTP or HTTPS connection.

The result of each basic check command is next supplied to the central server by the computer, in the form of an http or HTTPS request.

An implementation such as this, by way of the HTTP protocol, ensures that the establishment of an agent on the computers being administered occurs more simply and does not require any complex parameterisations on the workstations.

Depending on the defined parameterisation on the platform, for the action in question, the result of a command can be an error, a warning or a success. In every instance, in this embodiment, the occurrence of a result is forwarded by specific actions such as:

- transmitting an electronic message to a team responsible for processing the incident (e.g., an administrator) or to the user of the computer itself or any other person known by the system or not (e.g., such as an immediate supervisor of the user, who can be searched for in an LDAP directory) or any computer system capable of analysing this electronic message;
- displaying a window on the computer in order to inform the user of the result of the task;
- displaying a window querying the user about a decision to be taken in relation to the event that has occurred (e.g., when a command could not be executed);
- executing a corrective command determined by the central server;
- programming the restart of the task after correction of an incriminated element which caused a preceding command to fail, for example;
- creating an incident ticket in an incident management system.

In addition, in this embodiment, each event (result of executing a command) is visible on a supervisory console which, for example, enables the support teams to control the operating state thereof, computer-by-computer.

In this embodiment, in order to operate, the system has:

- a network enabling the workstations and the servers to communicate;
- a set of servers capable of interacting with the workstations in a specific protocol (http, https) on parameterable ports;
- an administration tool where the commands to be carried out will be described, their potential results and the actions that may arise as well as decisions to be taken if necessary;
- a tool for defining operations and scripts, wherein the elements are defined which enable a computer to be identified in order to communicate to same the commands to be executed;
- a scheduler (tools for programming a set of commands in the form of an operation and scripts) making it possible to describe at which moment a command (or set of commands) is executed on a given workstation;
- a software agent installed on each workstation;
- a system of communicating between the server and the computers;
- a software solution enabling the status of the actions to be displayed for all or part of the group of workstations.

The process for implementing the invention, in this embodiment of the invention, comprises the following steps:

1. an administrator, belonging to a service responsible for defining the administration, maintenance and operational upkeep operations, describes, in the database, the step, frequency thereof, potential results and actions to be undertaken on the basis of the results of executing the commands;

2. a service responsible for offering the user the guarantee that the station will operate properly then records, for each machine, the sequence of tasks which correspond thereto or which correspond to the user of the workstation. The maintenance operations and the parameters thereof are recorded in the database;

3. an agent installed on the computer periodically queries the central server to find out if, at the moment of the query, it has an action to carry out on the station. The server then consults the database thereof and looks to see if the station name is recorded in the database and, if a command is available, communicates the name of the command to be launched as well as the possible required parameters to the workstation;

4. the agent then executes the command indicated in step 3 along with the parameters thereof and verifies the proper execution of same;

5. at the end of the execution operation, the agent sends the result to the server. Depending on circumstances, the server executes an action on an external system (sending of a message, for example), asks the station to display a window on the workstation or to carry out a corrective action;

6. the result of the command is specifically marked on the server in order to be able to subsequently identify, within an appropriate verification system, the commands which caused errors;

7. when an error occurs, it must be processed. However, it can be eliminated after a parameterable time period, thereby enabling the periodic process to be continued. It will remain visible in the supervisory operation as a self-overlooked error.

8. the computer agent then awaits a parameterable time period (based on an indication supplied to it by the server) prior to once again querying the server to search for new commands to be executed (step 3). Thus, after a series of commands have been executed, the computer queries the server. The latter, observing that no new command must be executed by the computer, sends a wait command to same, which means that the computer which receives this command must wait a certain time before once again making a request on the server. This wait period can be astutely close to the time which separates the query by the client from the day or time anticipated for the next command.

9. when all of the steps have been carried out, the server archives the results observed and then generates another operation for this station, which is based on the results of the preceding operation.

3. Presentation of the Tasks According to an Embodiment of the Invention

The computers connected to a management entity which implements the method of an embodiment of the invention receives from the latter commands to be executed either individually (i.e., each command is sent one after the other) or as a series of commands (i.e., several commands are sent together to the computer which must execute them one after the other). The advantage of sending only one command at a time is that, as the command results are received, the management entity is enabled to:

automatically construct a set of commands to be executed during a next maintenance operation, based on the implementation result;

record the set of commands to be executed within the operations database;

and to optionally modify the operation in progress or decide upon the start-up of a new operation, in the case where the errors encountered as a result of the preceding command are extremely serious.

The responsiveness of the management entity is thereby improved since it is not obliged to wait until the end of the series of commands in order to know the results thereof.

The basic command and the decision making (i.e., the action to be carried out in the management entity at the end of executing the command, based on the result thereof) are consolidated, according to an embodiment of the invention, under the term of "basic task". Therefore, for each basic task within the operations database there exists:

The command to be executed and the associated parameters, which further comprise information making it possible to know:

If the command can be executed when a user session is open;

If the command must be executed with an open user session.

The results-based behaviour:

What is the action to be carried out in the event of a failure?

How to analyse the command failure code?

What is the action to be carried out in the event of a success?

Certain command parameters and certain actions are specific to particular scripts. For example, for the two following scripts, specific parameters will be used and available within the operations database:

Script 1: Checking for available space on the disk:

This script comprises a task which identifies:

What is the minimum space beyond which intervention is required?

What action must be carried out in the event of waiting for a certain percentage of remaining space:

What action must be carried out in the event of waiting for another percentage of remaining space?

Script 2: Checking for mandatory software:

Each task of this script indentifies:

The name of the software

The method of searching for the software on the machine (register key or presence of a file)?

What action must be carried out if the software is absent?

Is there an automatic remote distribution request?

What is the name of the package to be distributed?

Which distribution tool of the business is to be used?

Is there user information?

Is there Help Desk information?

In this way, by breaking up the maintenance operations into scripts, an embodiment of the invention enables the execution parameters to be modified for each command to be executed and for each script defined within the operations base.

4. Examples of Basic Commands

Examples of basic commands to be executed on the computer are presented hereinbelow, which are capable of being grouped together as scripts, as well as the corrective or informative actions implemented:

Command: Check of the hard disk, thereby enabling obtainment of status of the fragmentation of the hard disk;

Action: transmittal of electronic mail to the support teams;

Command: Check of the trackings ("logs") of events. Some events are characterised as "Error", others as "Warning";

Action: transmittal of electronic mail to the support teams, when the errors or warnings are detected;

Command: Cleaning of event traces (which are automatically recorded by the operating system used on the computer);

Action: none

Command: Compression of the data on the hard disk (Script which can only executed during the night);

Action: None, unless the action is not carried out correctly: transmittal of electronic mail to the support teams;

Command: Backup of "user" data;

Action: none;

Command: Verification of the size of certain files (such as PST files containing information about electronic mail recorded within the computer and capable of posing problems to certain applications);

Action: Opening of a warning window intended for the user if authorized size is exceeded;

Command: Deletion of trace files for more than n months (global parameter);

Action: None;

Command: Deletion of the files from a list of parameterable extensions (*bak, *temp, . . . unopened (conditional based on the remaining disk space);

Action: None;

Command: Detection of forbidden software (list of signatures, warning or error):

Error action: Automatic un-installation of the forbidden software;

Action: Opening of a warning window intended for the user in order to require the deletion of the forbidden software;

Command: Deletion of the shortcuts which do not point to any file;

Action: Opening of a warning window intended for the user:

Command: Deletion of the shortcuts which point to the same file and which are in the same directory;

Action: None;

Command: Analysis of trace files with specific script which relates back to the error or warnings:

Action: Opening of a warning window intended for the user or a warning or error (depending on the parameter for the trace file in question);

Command: Deletion of the cookies for more than n months (n is parameterable);

Action: None;

Command: Detection of forbidden extensions (".divx" for example);

Action: Opening of a warning window intended for the user in order to request same to delete these files;

Command: Verification of the state of the hard disk (or any other medium connected to the computer);

Action: Opening of a warning window intended for the user in order to warn same of a potential problem;

Error action: Immediate programming of a command to correct the defective sectors;

5. Detailed Sequencing of the Interactions Between a Station and the Server

Figure 2:
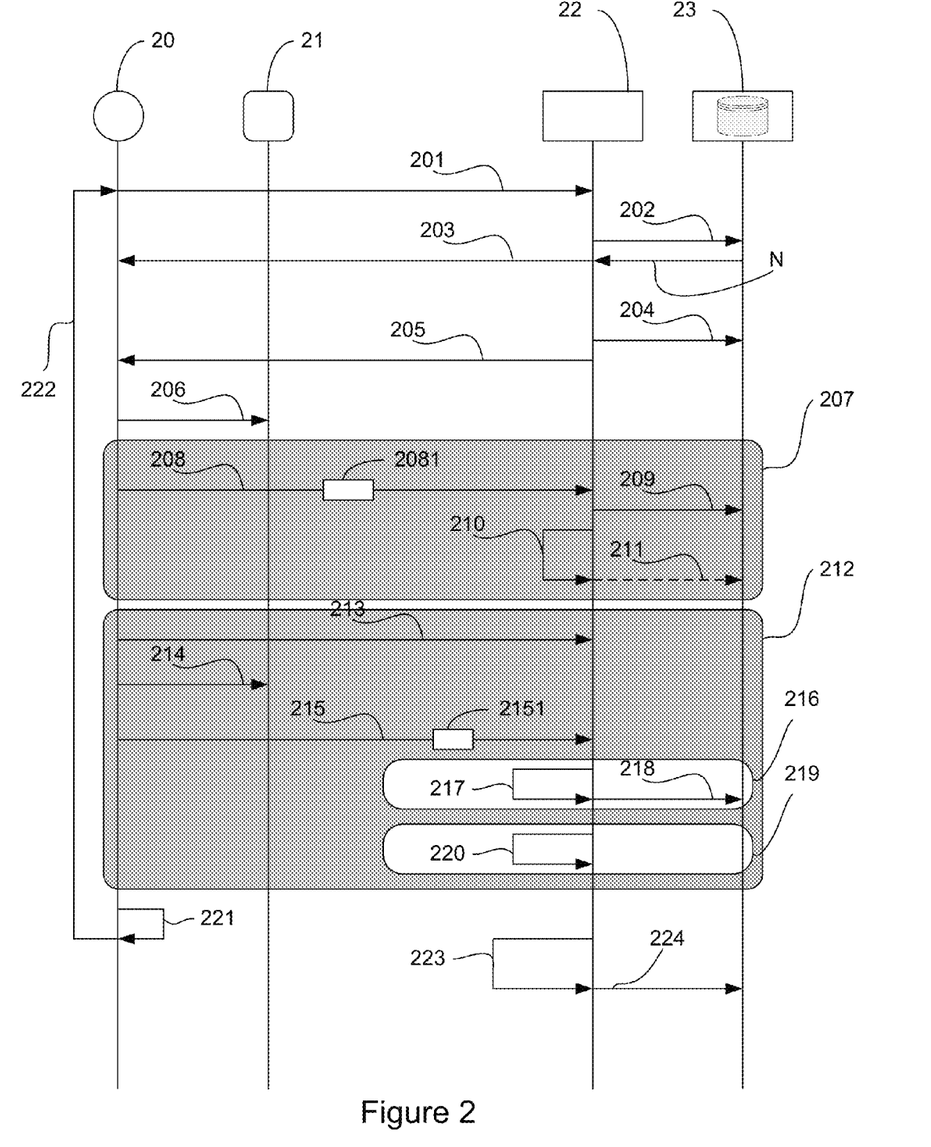
FIG. 2 shows in detail a system linkage enabling the execution of a command in the system architecture of FIG. 1.

An exemplary detailed sequencing of the interactions between a computer 21 and a server 22 implementing the method of an embodiment of the invention are presented in relation to FIG. 2.

1. The agent 20, installed on the station, requests 201 the server 22 for a command to execute (the agent 20 is started up at the same time as the computer 21);

2. the server 22 inspects 202 the database 23 to see if:

a. the station does indeed exist in its base;

if not (N), the server 22 responds 203 to the agent 20 that "no action is to be taken";

b. if a command to be executed is present to this machine and must be executed at the moment (i.e., it is programmed at a moment T less than or equal to the moment when the request from the agent 20 has arrived at the server 22);

if not (N), the server 22 responds 203 to the agent 20 that there is "no action to be taken";

3. The server 22 inspects 204 the database 23 to know the command and the parameters to be provided to the agent 20;

4. The server 22 provides 205 the agent 20 with the name of the command to be executed and the associated parameters;

5. The agent 20 launches 206 the command on the station 21 with the parameters provided:

a. if the command is not present 207:

i. the agent 20 informs 208 the server 22 of same in the form of a codified "warning" type event 2081, i.e., a specific warning indicating the absence of the command;

ii. the server 22 inspects 209 the database 23 in searching for an action to carry out for the codified event 2081 received;

iii. the server 22 carries out 210 the action corresponding to the received code (electronic mail transmittal, for example), and requests 211 a subsequent recording in the database 23;

b. if the command is present 212:

i. the agent informs 213 the server 22 that the command has been launched;

ii. the agent 20 supervises 214 the execution of the command;

iii. at the end of the command, the agent 20 returns 215 the result 2151 of the executed command to the server 22;

iv. if the execution 206 if the command is a failure 216, the server 22 analyses 217 an error code and searches 218 for an action to carry out for the code of this command;

An implementation such as this enables operational upkeep of the computer to be carried out. The corrective action to be carried out will enable proper operation of the computer to be ensured or at the very least (if the error cannot be repaired), the user data to be saved, for example.

v. if the execution 206 of the command is successful 219, the server 22 advances 220 the scheduler by one task (i.e., it moves to the following task in implementing the script);

6. the agent 20 is placed on standby 221 for a defined period and the process is once again executed 222 as of step 1 (new request 201);

7. when no further action is to be carried out for the station 223, the server 22 archives 224 the information relating to the set of tasks carried out and regenerates an empty occurrence of the operation for the station.

In this way, the method of an embodiment of the invention, as a result of the regular communication between the computer and the management entity, enables account to be taken of the occurrence of events which are not pre-programmed, and by means of the task mechanism, which comprises a command and a plurality of actions associated with this command, enables corrective actions to be taken following errors.

In a particular embodiment of the method of the invention, it is likewise possible for the management entity, upon receipt of a request to obtain a command from the computer, to provide the latter with a wait command, rather than a response of the "no action to be carried out" type. Such an embodiment has the advantage of enabling the management entity to schedule the maintenance operations for several computers so as to not be overloaded with processing. This therefore involves a self-regulating mechanism of the management entity. In addition, such an embodiment enables the computer, which is the subject of the maintenance operations by the agent that it implements to not unceasingly ask the management entity what it must do. Such a wait command can be astutely parameterised in order to ask the computer to submit a new request at a moment close to the time when same must be executed.

6. Architecture of a Management Entity According to an Embodiment of the Invention An embodiment of a management entity which implements the method according to the invention is presented in relation to FIG. 4.

Figure 4:
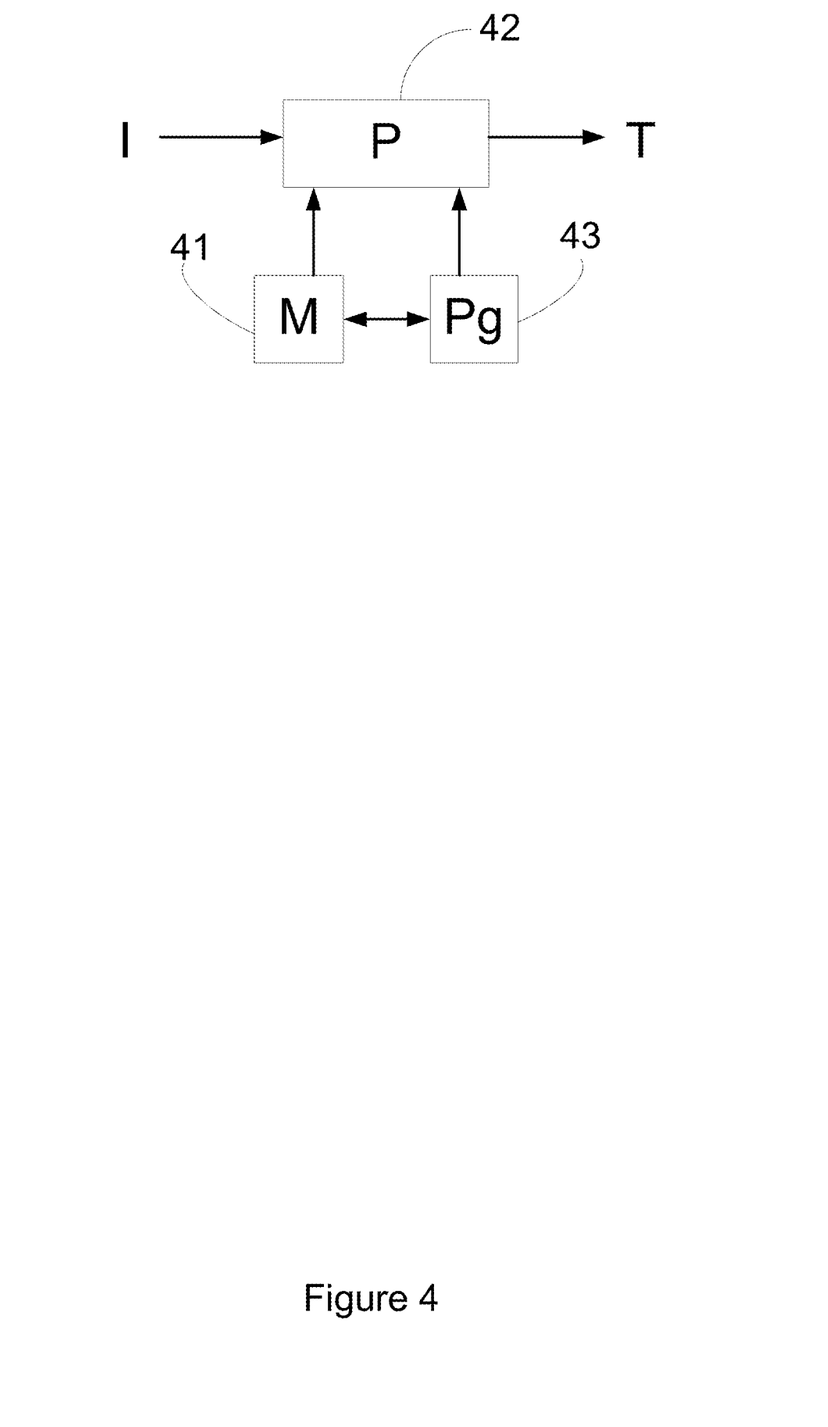
FIG. 4 describes the physical architecture of a management entity according to an embodiment of the invention.

Such an entity comprises a memory 41 consisting of a buffer memory, a processing unit 42 which, for example, is equipped with a microprocessor μP, and which is controlled by the computer program 43, which implements the management method according to an embodiment of the invention.

Upon initialization, the computer program 43 code instructions are, for example, loaded into a RAM memory prior to being executed by the processor of the processing unit 42. The processing unit 42 receives as input at least one item of information I to process (such as a query request or a command execution result). The microprocessor of the processing unit 42 implements the steps of the above-described method, according to the computer program 43 instructions, in order to deliver a processing item of information T (such as a command to be executed or a result to be recorded in the database). To accomplish this, besides the buffer memory 41, the device comprises request and response-formulating means, and information processing means which, in particular, enable the method of an embodiment of the invention to be carried out. These means are controlled by the microprocessor of the processing unit 42.

Although the present disclosure has been described with reference to one or more examples, workers skilled in the art will recognize that changes may be made in form and detail without departing from the scope of the disclosure and/or the appended claims.

The invention claimed is:

1. A method of managing administration and maintenance operations for a computer connected to a communication network, wherein the method comprises:

a phase of receiving a request of at least one command to be executed, originating from said computer;

a phase of programmed sequential distribution of said at least one command previously recorded within an operations database, intended for said computer; and a phase of recording, within a database for collecting results associated with said computer, at least one result of implementing said at least one sequentially distributed command, and wherein said phase of programmed sequential distribution of said at least one command previously recorded comprises:

a step of searching, within said operations database, for a command to be transmitted to said computer based on command distribution programming providing command presence information;

a step of transmitting, to said computer, said command to be transmitted when said presence information is positive; and a step of transmitting a hold command for said computer, when said presence information is negative.

2. The method of claim 1, wherein the method comprises:
a phase of automatically constructing a set of commands to be executed during a next maintenance operation on the basis of said at least one implementation result; and
a phase of recording, within said operations database, said set of commands to be executed.

3. The method as claimed in claim 1, wherein the method comprises, within said computer:
a phase of executing said at least one command previously distributed during the distribution phase; and
a phase of transmitting said at least one implementation result of said at least one command.

4. The method as claimed in claim 3, wherein said execution phase comprises:
a step of executing said at least one command;
a step of formatting said at least one result of implementing said at least one command; and
a step of transmitting said at least one implementation result.

5. The method as claimed in claim 3, wherein said execution phase further comprises a first step of displaying a presentation interface comprising said at least one implementation result of said at least one command.

6. The method of claim 5, wherein said execution phase further comprises a second step of displaying a presentation interface comprising a warning intended for a user of said computer.

7. The method as claimed in claim 1, wherein, when said at least one command results in failure, said recording phase comprises:
a step of issuing an electronic message to party involved in processing an incident;
a step of automatically programming execution of a corrective command, when said corrective command exists;
a step of automatically programming a new execution of said at least one command when said corrective command has been executed; and
a step of creating an incident ticket in an incident management system.

8. A management and administration operations management entity for a computer connected to a communication network, wherein the management entity comprises:
a processing unit;
executable instructions which, when executed by the processing unit, configure the processing unit to:
receive a query request for at least one command to be executed, originating from said computer;
perform a programmed sequential distribution of said at least one command previously recorded within an operations database, intended for said computer, wherein the processing unit is configured to:
search, within said operations database, for a command to be transmitted to said computer based on command distribution programming providing command presence information,
transmit, to said computer, said command to be transmitted when said presence information is positive; and
transmit a hold command for said computer, when said presence information is negative; and
record, within a database for collecting results associated with said computer, at least one result of implementing said at least one sequentially distributed command.

9. A non-transitory computer-readable medium storing instructions, which when executed by a microprocessor of a second computer, perform a method of managing administration and maintenance operations for a first computer connected to a communication network, wherein the method comprises:
a phase of receiving a request of at least one command to be executed, originating from said first computer;
a phase of programmed sequential distribution of said at least one command previously recorded within an operations database, intended for said first computer; and
a phase of recording, within a database for collecting results associated with said first computer, at least one result of implementing said at least one sequentially distributed command, and said phase of programmed sequential distribution of said at least one command previously recorded within an operations database comprises:
a step of searching, within said operations database, for a command to be transmitted to said computer based on command distribution programming providing command presence information;
a step of transmitting, to said computer, said command to be transmitted when said presence information is positive; and
a step of transmitting a hold command for said computer, when said presence information is negative.

* * * * *

UNITED STATES PATENT AND TRADEMARK OFFICE
CERTIFICATE OF CORRECTION

PATENT NO. : 8,402,125 B2
APPLICATION NO. : 12/739910
DATED : March 19, 2013
INVENTOR(S) : Soulet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this
First Day of September, 2015

Michelle K. Lee
*Director of the United States Patent and Trademark Office*